3,050,401
PROCESS AND COMPOSITION FOR PRESERVATION AND IMPROVED COLOR RETENTION OF MEATS
August R. Kohler, Trenton, N.J., Wilbur H. Miller, Springdale, Conn., and Harold M. Windlan, Trenton, N.J., assignors to American Cyanamid Company, New York, N.Y., a corporation of Maine
No Drawing. Filed July 10, 1953, Ser. No. 747,598
8 Claims. (Cl. 99—157)

This invention relates to food, its improvement and preservation. More particularly, the invention relates to the treatment of fresh cut meat whereby its quality and appearance are maintained over longer periods of time than would otherwise be the case.

The control of meat spoilage is a major economic problem and is important from the standpoint of public health. Fresh cut meat displayed in retail outlets are subject to rapid bacterial spoilage and color deterioration. Fresh meats especially when pre-packaged require an environment of relatively high humidity in order to preserve a good color appearance. If the humidity is too low, rapid surface drying is enhanced with accompanying browning or darkening of the exposed surfaces. On the other hand, subjection of the surfaces of meat to moisture enhances the opportunity for microorganisms to multiply rapidly, thereby increasing the danger of spoilage. Further, it is virtually impossible under the usual conditions for handling, preparing and displaying pre-packaged fresh meats to prevent contamination of the surfaces of the meat with a multitude of microorganisms. As a result, it has usually been considered necessary to keep meat under refrigeration in large wholesale cuts for cutting and packaging at the retail outlet.

Obviously, from a commercial standpoint adequate means for controlling microbial spoilage and color loss of fresh cut meats for longer periods of time than have heretofore been obtained would be highly desirable. It would permit delivery of consumer packaged meat instead of quarters or halves of carcasses thereby resulting in greater economy, better and more centralized quality control as well as less waste in terms of trimming losses. Furthermore, deterioration of meat in transit would be curtailed whereby meat with a longer shelf life would reach the ultimate consumer.

In view of the success of antibiotics in controlling the growth of many organisms, considerable attention has been directed toward the use of antibiotics for controlling meat spoilage. Various investigations have shown that when antibiotics, particularly the broad-spectrum antibiotics such as chlortetracycline, oxytetracycline and tetracycline, were applied to the surfaces of fresh meat, bacterial growth was inhibited. Further observations revealed that the shelf life of the meat so-treated was extended for several days.

Unfortunately, the shelf life of pre-packaged cut meat is still not as long as desired and spoilage comes sooner than is desired. Also, there is a rapid deterioration of the bright red color of most cut meat which makes the meat undesirable to prospective consumers, even though the meat might still be sufficiently free from pathogenic microorganisms as to be safely edible. Sometimes the texture and odor of fresh cut meat deteriorates even though the meat may not be sufficiently spoiled to be inedible.

We have now discovered that we can enhance the refrigerated shelf life and organoleptic properties of color, odor and texture of fresh cut meat products without impairing its flavor for considerable periods of time by the conjoint application of an antibiotic of the type and kind to be more particularly described hereinafter and nystatin or myprozine from 0.5 to 100 parts per million based on the weight of the meat.

The antibiotics that may be used to advantage in practicing the present invention should have as wide a bacterial spectrum as possible and be able to inhibit the growth of the bacteria that are generally encountered in spoiled meat. The antibiotic should be relatively stable under conditions found in meat, non-toxic and not adversely affect the color or taste. The antibiotic should also be water soluble to the extent that the quantities which are necessary for treatment can be applied in the form of an aqueous solution if desired.

Preferred antibiotics for use in the present invention are those of the tetracycline series, including chlortetracycline, bromotetracycline, oxytetracycline and tetracycline itself. Of these, chlortetracycline apears to have the most desirable properties. Other wide-spectrum antibiotics such as chloramphenicol may also be used to practice the invention. These antibiotics may be used in any of their water-soluble forms, usually as a mineral acid salt such as the hydrochloride. However, various other metallic salts such as the alkaline earth metal salts and the alkali metal salts may be used. Water-soluble complexes such as the borate or phosphate may also be used if desired.

In carrying out the present invention, an aqueous solution or substantially dry powder containing the antibiotic and either nystatin or myprozine is first prepared. Although no adjustment of the pH of the solution is necessary, it is possible, if desired, to stabilize the solution with suitable buffering agents. The solution or dry powder is then applied to the exposed surface of the cut meat at about 40–50° F. Although application at ordinary room temperature is possible, we prefer that the treatment of the cut meat be carried out between 40–50° F. in order to minimize the possibility of an onset of bacterial development which may occur at ordinary room temperature. Application of the solution may be done by instantaneously dipping the exposed surfaces of the cut meat in the solution or, if desired, the solution can be sprayed on the exposed surfaces of the meat utilizing any mechanical sprayers, hand atomizers, or the like. Application may also be made to the exposed surfaces of the meat either mechanically or by hand using a substantially dry powder mix containing the antibiotic and either nystatin or myprozine. However, in using the dry powder method of application, it is necessary that a bulk carrier be added in order to effectuate an even distribution of the dry powder comprising the antibiotic together with nystatin or myprozine over all the exposed surfaces of the meat.

The carrier employed may be common salt, flour salt, which is a finely divided form of common salt, monosodium glutamate, starch, glucose and the like. The preferred carrier is common salt, although any edible powdered material which is inert to the meat and the antibiotic may be used.

If application is made by dipping or spraying, it is desirable to allow the cut meat so treated to drain for five to sixty minutes to remove the excess solution.

Following the treatment of the meat as described, the meat is then tray packed or placed on backing board, overwrapped in a suitable heat-sealable flexible film as, for example, polyethylene, coated cellophane, or the like and stored under refrigeration at about 35–40° F.

The amount of broad-spectrum antibiotic applied to the fresh cut meat should be from about 0.5 to 100 parts per million of the antibiotic, chlortetracycline, oxytetracycline, tetracycline, etc., based on the weight of the meat. This may be achieved by dipping the meat in an aqueous solution containing from about 10 parts to 1000 parts by weight of the antibiotic, or by spraying such a solution on the meat. When the antibiotic is applied by dusting a powder on its surface, the dry powder may contain from about .05 to about 10 percent by weight of the antibiotic.

The other active components of the treating composition, nystatin or myprozine, should be present so that from 0.5 part by weight to 500 parts by weight of these should be retained on the meat as a result of the treatment. The aqueous solution in which the meat is dipped should, therefore, contain about 10 parts to 1000 parts by weight of nystatin or myprozine. If these two agents are applied as a dry powder with the antibiotic, the powder should contain 0.05 percent to 10 percent by weight of these.

Nystatin and a method of producing it are disclosed in United States Patent No. 2,797,183 to E. L. Hazen et al., issued June 25, 1957. Myprozine is described in United States application Serial No. 599,394, filed by Edward J. Backus et al. on June 23, 1956. The product is produced by cultivating culture A-5283 under submerged aerobic conditions in an aqueous nutrient medium containing an assimilable source of carbohydrate, nitrogen and inorganic salts.

We have found that the conjoint application of an antibiotic as described herein and either nystatin or myprozine gave results not foreseeable from the work previously reported in the prior art. We found that in treating fresh cut meat with such combinations, a synergistic action was obtained resulting in both the extension of the refrigerated shelf life and retention of good organoleptic properties of the fresh cut meat so treated for longer periods of time than has heretofore been accomplished.

The meat used in carrying out this invention was obtained from various wholesale outlets as hind and fore quarters and cut to approximately the same size as is generally sold for consumer use employing standard retail procedures.

The invention is applicable to the treatment of fresh cut meats in general, that is beef, pork, veal, and the like. Fish and poultry may be similarly treated if desired. Cured meats such as hams and various other specialty products may also advantageously be treated by the methods of this invention.

The invention will be described in greater detail in conjunction with the following specific examples. Unless otherwise stated, all parts are by weight.

EXAMPLE 1

Fresh boneless chuck was cut into approximately one inch cubes. The meat samples were divided into four groups having about 5 samples per group. Group I represents untreated meat and corresponds to the control. Group II represents meat treated with 3 parts per million chlortetracycline hydrochloride in substantially dry powder form homogeneously dispersed in flour salt. Group III represents meat treated with a substantially dry powder mixture containing 3 parts per million chlortetracycline hydrochloride and 10 parts per million nystatin homogeneously dispersed in flour salt. Group IV represents meat treated with a substantially dry powder mixture containing 3 parts per million chlortetracycline hydrochloride and 10 parts per million myprozine homogeneously dispersed in flour salt. The powder used to dust the cut meat contained approximately .15% by weight of chlortetracycline and .5% by weight nystatin or .5% by weight myprozine.

The treatment was carried out by applying the dry powder mix containing the desired concentration to the exposed surfaces of the meat at the rate of 2 grams per kilogram of meat using a conventional hand shaker. The portions of beef chuck were then double ground, prepared as patties, tray packed, overwrapped with water resistant coated cellophane and stored under refrigeration at about 36° F. for the duration of the experiment. Samples were removed periodically from each group and microorganism counts were made. Observations were made of the color and general appearance of the samples. Samples for bacterial counts were prepared by homogenizing the sample of meat in a sterile blender containing sterile distilled water in an amount equal to three times the weight of the meat for three to five minutes.

Based on the microorganism count and appearance, it was determined when the meat would be considered spoiled, that is to say unacceptable for consumer use and discolored when the change in color was sufficient to render the meat unacceptable for human use. Table 1 shows the number of days before spoilage and discoloration took place. In the case of spoilage, the test was not continued beyond the twenty-second day at which point the microorganism count was still within acceptable limits. This is indicated by the plus mark after the day number.

Table 1

| Group | Treatment before storage | Spoilage, days | Discoloration, days |
|---|---|---|---|
| I | Control (untreated) | 7 | 5 |
| II | Chlortetracycline hydrochloride 3 p.p.m. | 11 | 13 |
| III | Chlortetracycline hydrochloride 3 p.p.m. plus 10 p.p.m. Nystatin. | 22+ | 20 |
| IV | Chlortetracycline hydrochloride 3 p.p.m. plus 10 p.p.m. Myprozine. | 22+ | 22 |

The results of Table 1 show that when beef chuck was treated with combinations of chlortetracycline hydrochloride-nystatin and chlortetracycline hydrochloride-myprozine, an increase in shelf life of at least 15 and 11 days was respectively obtained over untreated meat and meat treated with chlortetracycline hydrochloride alone. It is also shown that good color appearance of the meat was maintained 15 to 17 days longer than the control and 7 to 9 days longer than the meat treated with chlortetracycline hydrochloride alone.

EXAMPLE 2

The procedure of Example 1 was repeated using fresh boneless beef chuck. In this series of experiments group I represents untreated meat. Groups II and III represent meat treated with 3 and 10 p.p.m. respectively of substantially dry powdered nystatin homogeneously dispersed in flour salt. Groups IV and V correspond to groups III and IV of Example 1. The data obtained are shown in Table 2.

Table 2

| Group | Treatment before storage | Spoilage, days | Discoloration, days |
|---|---|---|---|
| I | Control (untreated) | 6 | 4 |
| II | Nystatin—3 p.p.m. | 8 | 8 |
| III | Nystatin—10 p.p.m. | 8 | 6 |
| IV | Chlortetracycline hydrochloride 3 p.p.m. plus 3 p.p.m. Nystatin. | 15 | 14 |
| V | Chlortetracycline hydrochloride 3 p.p.m. plus 10 p.p.m. Nystatin. | 15 | 14 |

The results of the table show that when beef chuck was treated with combinations of chlortetracycline hydrochloride and nystatin, an increase in shelf life of 7 to 9 days respectively was obtained over meat treated with nystatin alone and untreated meat. It is also shown that good color appearance of the meat was maintained 10 days longer than untreated meat and from 6 to 8 days longer than meat treated with nystatin.

EXAMPLE 3

The procedure of Example 1 was repeated using fresh pork loin. The meat samples were divided into five groups as described in Example 2. The results are shown in Table 3.

Table 3

| Group | Treatment before storage | Spoilage, days | Discoloration, days |
|---|---|---|---|
| I | Control (untreated) | 9 | 9 |
| II | Nystatin—3 p.p.m. | 11 | 14 |
| III | Nystatin—10 p.p.m. | 11 | 14 |
| IV | Chlortetracycline hydrochloride 3 p.p.m. plus 3 p.p.m. Nystatin. | 21+ | 18 |
| V | Chlortetracycline hydrochloride 3 p.p.m. plus 10 p.p.m. Nystatin. | 21+ | 16 |

EXAMPLE 4

Example 3 was repeated except that the application of the dry powder mixtures to the exposed surfaces of the meat were carried out at the rate of 6 grams per kilogram of meat. The results are shown in Table 4.

Table 4

| Group | Treatment before storage | Spoilage, days | Discoloration, days |
|---|---|---|---|
| I | Control (untreated) | 15 | 7 |
| II | Nystatin—3 p.p.m. | 16 | 7 |
| III | Nystatin—10 p.p.m. | 16 | 7 |
| IV | Chlortetracycline hydrochloride 3 p.p.m. plus 3 p.p.m. Nystatin. | 20 | 15 |
| V | Chlortetracycline hydrochloride 3 p.p.m. plus 10 p.p.m. Nystatin. | 20+ | 20+ |

EXAMPLE 5

Fresh boneless beef chuck was cut into approximately one inch cubes. The meat samples were divided into four groups having 5 samples per group. Group I represents untreated meat. Group II represents meat treated with an aqueous solution containing 3 parts per million chlortetracycline hydrochloride. Group III represents meat treated with an aqueous solution containing 3 parts per million chlortetracycline hydrochloride and 10 parts per million nystatin. Group IV represents meat treated with an aqueous solution containing 3 parts per million chlortetracycline hydrochloride and 10 parts per million myprozine.

The treatment was carried out by spraying the solutions containing the desired combinations on the exposed surfaces of the meat at the rate of 2 milliliters per kilogram of meat using a De Vilbis hand atomizer. The rest of the procedure was the same as described in Example 1.

The results obtained are shown in Table 5.

Table 5

| Group | Treatment before storage | Spoilage, days | Discoloration, days |
|---|---|---|---|
| I | Control (untreated) | 10 | 5 |
| II | Chlortetracycline hydrochloride 3 p.p.m. | 12 | 12 |
| III | Chlortetracycline hydrochloride 3 p.p.m. plus 10 p.p.m. Nystatin. | 12 | 17 |
| IV | Chlortetracycline hydrochloride 3 p.p.m. plus 10 p.p.m. Myprozine. | 17 | 17+ |

The results of Table 5 further illustrate that when the meat was treated with combinations of chlortetracycline hydrochloride and either nystatin or myprozine a pronounced increase in shelf life and maintenance of a good color appearance was achieved over untreated meat and meat similarly treated with chlortetracycline hydrochloride alone.

EXAMPLE 6

Fresh beef round steak was cut into portions of about ¾ inch thickness and weighing approximately one pound. The meat samples were divided into two groups having about 5 samples per group. Group I represents untreated meat and group II represents meat treated with a substantially dry powder mixture containing 3 parts per million chlortetracycline hydrochloride and 10 parts per million myprozine homogeneously dispersed in flour salt. The rest of the procedure is the same as described in Example 1.

The results obtained are shown in TABLE 6.

Table 6

| Group | Treatment before storage | Spoilage, days | Discoloration, days |
|---|---|---|---|
| I | Control (untreated) | 11 | 8 |
| II | Chlortetracycline hydrochloride 3 p.p.m. plus 10 p.p.m. Myprozine. | 18 | 16 |

EXAMPLE 7

The procedure was the same as in Example 6 except that the spray method of application was used as shown in Example 5. In this example, group I represents untreated meat and group II represents meat treated with an aqueous solution containing 100 parts per million chlortetracycline hydrochloride and 500 parts per million myprozine.

The results obtained are shown in Table 7.

Table 7

| Group | Treatment before storage | Spoilage, days | Discoloration, days |
|---|---|---|---|
| I | Control (untreated) | 8 | 9 |
| II | Chlortetracycline hydrochloride 100 p.p.m. plus 500 p.p.m. myprozine | 19 | 20 |

EXAMPLE 8

Fresh beef round steak was cut into portions of about ¾ inch thickness and weighing approximately one pound. The meat samples were divided into two groups having about 5 samples per group. Group I represents untreated meat and group II represents meat treated with an aqueous solution containing 20 parts per million chlortetracycline hydrochloride and 100 parts per million myprozine.

The treatment was carried out by instantaneously dipping the meat in a four gallon vessel containing the solution of the desired concentration, drained for 5 to 10 minutes to remove any excess solution, placed on backing board, overwrapped with cellophane and stored at 36° F. for the duration of the experiment. The rest of the procedure is the same as shown in Example 1.

The results obtained are shown in Table 8.

Table 8

| Group | Treatment before storage | Spoilage, days | Discoloration, days |
|---|---|---|---|
| I | Control (untreated) | 11 | 9 |
| II | Chlortetracycline hydrochloride 20 p.p.m. plus 100 p.p.m. myprozine | 18 | 16 |

In the examples, nystatin and myprozine are shown as the only added materials in each formulation. They are, of course, equally effective if a mixture is used but ordinarily this does not present any important advantage. The invention, however, includes the use of mixtures.

We claim:

1. A method of preserving the quality and appearance of fresh cut meat which comprises contacting the surface of fresh cut meat with a solution containing from 0.5 to 100 p.p.m. of a broad-spectrum antibiotic and myprozine in amounts from 0.5 to 500 p.p.m. the amounts of both antibiotic and myprozine being based on the weight of the meat.

2. A process in accordance with claim 1 in which the antibiotic is chlortetracycline.

3. A method of maintaining the quality and appearance of fresh cut meat which comprises the step of immersing a cut of fresh meat in an aqueous solution containing 10 parts to 1000 parts by weight of a broad-spectrum antibiotic of the group consisting of chlortetracycline, tetracycline, oxytetracycline and chloramphenicol and from 10 parts to 1000 parts by weight of myprozine.

4. A method of preserving the quality and appearance of fresh cut meat which comprises the step of dusting over the freshly cut surface thereof a powder comprising an inert carrier and from .05 percent to 10 percent of a broad-spectrum antibiotic of the group consisting of chlortetracycline, tetracycline, oxytetracycline and chloramphenicol and 0.05 percent to 10 percent by weight of myprozine.

5. A composition of matter for the preservation of fresh cut meat which comprises a mixture of an inert carrier and .05 percent to 10 percent by weight of a broad-spectrum antibiotic of the group consisting of chlortetracycline, tetracycline, oxytetracycline and chloramphenicol and .05 percent to 10 percent by weight of myprozine.

6. A composition in accordance with claim 5 in which the inert carrier is water.

7. A composition in accordance with claim 5 in which the inert carrier is finely divided sodium chloride.

8. A composition of matter in accordance with claim 5 in which the composition of matter is in a finely powdered form suitable for dusting.

References Cited in the file of this patent

UNITED STATES PATENTS

| | | |
|---|---|---|
| 2,797,183 | Hazen et al. | June 25, 1957 |
| 2,866,708 | Broquist et al. | Dec. 30, 1958 |
| 2,944,907 | Pagano et al. | July 12, 1960 |

OTHER REFERENCES

"Food Technology," April 1953, pp. 165 and 166, article entitled The Use of Antibiotics in Preservation of Fresh Beef, by Goldberg et al.

"Antibiotic Symposium," October 1957, Paper No. 101 by A. P. Struyk et al., article entitled Pimaricin, a New Antibiotic.

"Applied Microbiology," March 1954, pp. 88–94, inclusive, article entitled The Use of Antibiotics in Meat Processing, by H. H. Weiser et al.

"Food Technology," October 1958, pp. 562–567, inclusive, article entitled Maintaining Freshness of Berries Using Selected Packaging Materials and Antifungal Agents, by J. C. Ayres et al.